Patented June 14, 1949

2,472,830

UNITED STATES PATENT OFFICE 2,472,830

PREPARATION OF SILICA CONTAINING CATALYSTS

Edward A. Hunter, Baton Rouge, La., assignor to Standard Oil Development Company, a corporation of Delaware No Drawing. Application October 16, 1946, Serial No. 703,479

6 Claims. (Cl. 252—451)

My present invention is concerned with improved catalysts. The invention more specifically relates to an improved process for the preparation of catalysts suitable for utilization in cracking, reforming, isomerization, polymerization and alkylation processes. My invention is particularly concerned with an improved method for the preparation of catalysts comprising silica. In accordance with my invention, catalysts comprising silica and alumina are prepared by treating a silica-magnesia or equivalent hydrogel with an aluminum salt under conditions to produce a catalyst comprising silica and alumina.

It is well known in the art to improve the quality of oils, particularly petroleum oils, by treating the same with catalysts under various operating conditions. For example, it is known to treat high-boiling petroleum oils with a catalyst comprising silica at temperatures in the range from about 600° F. to about 1100° F. in order to crack the oil and to secure petroleum oil fractions boiling in the motor fuel boiling range. Oxides of other metals, as for example, magnesium, manganese, zirconium, beryllium and aluminum are employed in conjunction with the silica. A particularly desirable catalyst suitable for treating petroleum oils boiling the gas-oil boiling range in order to produce lower boiling fractions comprises a silica-alumina catalyst.

Heretofore these catalysts have been prepared by various procedures. One method is to prepare the silica hydrogel by mixing an alkali silicate with an acid. The alkali silicate usually comprises a sodium silicate ($Na_2O.3.25SiO_2$) solution having a specific gravity of about 1.2. This is mixed with a sulfuric acid having a specific gravity somewhere in the range of about 1.19. The hydrosol may be impregnated with a soluble salt of the desired metal or the hydrosol may be allowed to gel and the resulting hydrogel washed and soaked in a solution comprising the salt of the desired metal or metals.

One method employed for the preparation of a silica magnesia catalyst is to prepare the hydrogel by the mixing of a silicate and sulfuric acid. The hydrogel is washed and mixed and granulated with magnesia and water. The mixture is passed through a colloid mill and homogenized. The catalyst is aged at room temperature for a period from about 24 to 72 hours. Elevated temperatures have also been employed, in which case the aging time period is reduced to a period of from about 5 to 10 hours. The catalyst is dried at a temperature in the range from about 200° F. to 270° F. Another method utilized for the preparation of the silica-magnesia catalyst is to prepare the silica hydrogel by mixing sulfuric acid and an alkali metal silicate. The silica hydrogel is washed and impregnated with magnesium sulfate. The impregnated silica hydrogel is treated with an ammonia solution to precipitate the magnesia. This may require a time period of from about 8 to 10 hours. A preferred method of preparing a catalyst comprising silica and magnesia is to add magnesia to a silica hydrosol or to a silica hydrosol impregnated with a metal salt such as with an aluminum salt. The mixture is washed preferably at elevated temperatures. The general process comprises adding magnesia preferably as a slurry in water to a silica hydrosol which has been impregnated with a salt, as for example, with an aluminum salt. The action of magnesia is to neutralize the free acid, thus causing rapid setting of the hydrosol to the hydrogel and also to decompose the aluminum salt or other salt present causing precipitation of alumina within and throughout the gel. Excess magnesia used over these requirements remains in the finished product as magnesia. The magnesia employed to neutralize the acid and the salt of the added third metal, reacts to form magnesium salt which is removed upon washing. If it is desired to produce a gel comprising silica and magnesia, excess magnesia is added preferably as a water slurry over that required to neutralize the excess acidity thus causing the formation of a gel comprising silica and magnesia.

I have now discovered an improved process for the preparation of a catalyst gel comprising silica-alumina. My process comprises preparing a hydrogel of silica and magnesia. This is prepared by any suitable means, preferably by preparing a silica hydrosol by the mixing of a sodium silicate with an acid preferably sulfuric acid. The silica hydrosol is treated with magnesia, preferably with a water slurry of magnesia, and gelled to form a gel comprising silica and magnesia. The resulting gel is then treated with a solution of an aluminum salt to produce a gel catalyst comprising silica and alumina.

The process of my invention may be readily understood by reference to the following examples illustrating modifications and embodiments of the same.

Example I 21 liters of silica hydrosol was prepared by adding 14 liters $Na_2O.3.5SiO_2$, sp. g. 1.21; to 7 liters $H_2SO_4$, sp. g. 1.19. To this sol was added a water slurry of magnesia, the water slurry comprising 2500 cc. of water and 1150 grams of magnesia. After agitation, this mixture was set to a brittle homogeneous hydrogel containing magnesia equivalent to 20% $Al_2O_3$ based on the silica content of the gel.

The gel was broken into lumps of ¼ to ½" in size and soaked in a solution of $Al_2(SO_4)_3$ containing $Al_2O_3$ equivalent to the excess magnesia present in the hydrogel. The volume of the $Al_2(SO_4)_3$ solution was adjusted to just cover the gel.

The gel was soaked in the $Al_2(SO_4)_3$ solution overnight, washed free of sulphate ion and dried in a steam oven.

The dried catalyst was activated at 850° F. This catalyst was employed to crack an east Texas gas oil having a gravity of 33.8° A. P. I. The cracking temperature was about 850° F. and the feed rate was about 0.6 volumes per volume of catalyst per hour. Upon distillation (Engler) 52% of the liquid product boiled below 400° F.

*Example II*

The catalyst prepared in accordance with Example I was heat treated at 1550° F. for three hours. This heat treated catalyst was employed to crack an east Texas gas oil boiling in the range of about 400° to 700° F. under the conditions specified in Example I. The product produced boiling below 400° F. was 47% by volume. This operation indicated that the catalyst had a high stability under high temperature conditions.

*Example III*

A catalyst prepared as described in accordance with Example I was steamed at 60 lbs. pressure and at a temperature of 1050° F. for 24 hours. This catalyst when employed to crack an east Texas gas oil as described in Examples I and II produced a product of which 28% boiled below about 400° F.

The process in my invention comprises preparing a silica-magnesia hydrogel by any suitable process. The resulting hydrogel is then soaked in a solution of aluminum salt. Any suitable salt of aluminum may be employed. However, the preferred salt comprises aluminum sulphate. By operating in this manner, a silica alumina catalyst is formed. This catalyst is washed to remove the magnesium sulphate and also any sodium sulphate present. The catalyst is then dried and activated as desired.

The process may be somewhat modified, for example, the silica-magnesia hydrogel may be washed with water to remove magnesium sulphate and sodium sulphate prior to soaking the silicia-magnesia hydrogel in an aluminum salt solution. Although I prefer to use room temperatures, in the soaking operation it is to be also understood that elevated temperatures and higher pressures may be employed.

By preparing the silica alumina hydrogel in accordance with my process, it is possible to get a hydrogel comprising a relatively high percentage of aluminum. This is secured by preparing a silica-magnesia hydrogel containing up to 60% magnesia and then to handle the resulting hydrogel as described. Under these conditions, a silica-alumina hydrogel is secured comprising as much as 50% by weight of alumina. It is to be understood that a three-component system comprising silica-magnesia and alumina may be readily prepared by utilizing an insufficient amount of aluminum sulphate so that the magnesia is not completely reacted to form magnesium sulphate which is subsequently removed by washing.

The process of my invention is not to be limited by any theory as to mode of operation but only in and by the following claims.

I claim:

1. Improved process for the preparation of a hydrogel comprising silica and alumina which comprises preparing a silica-magnesia hydrogel, soaking said hydrogel in a solution of a salt of aluminum, maintaining said hydrogel in contact with the aluminum salt solution for a sufficient period of time to cause the magnesia of the hydrogel to react with the aluminum salt to form a silica-alumina hydrogel and a magnesium salt and washing the silica-alumina hydrogel free of magnesium salt.

2. Process as defined in claim 1 wherein said aluminum salt solution comprises aluminum sulphate.

3. Process as defined by claim 1 wherein said hydrogel produced is dried at a temperature in the range from about 200°–275° F. and activated at a temperature of about 800° F.

4. Improved process for the preparation of a hydrogel comprising silica and alumina which comprises admixing a silica sol and an aqueous slurry of magnesia, converting the resulting mixture to a silica-magnesia hydrogel, contacting said hydrogel with a solution of a salt of aluminum for a sufficient period of time to permit the magnesia of the hydrogel to react with the said aluminum salt to form, by double decomposition, a silica-alumina hydrogel and a magnesium salt, and washing the silica-alumina hydrogel free of the magnesium salt.

5. Process as defined by claim 4 wherein said hydrogel comprising silica and magnesia is washed with water before treating said hydrogel with said aluminum salt solution.

6. Process as defined in claim 4 wherein said hydrogel comprising silica and magnesia is treated with an aluminum salt solution insufficient to completely react with said magnesia whereby a gel catalyst comprising silica-magnesia and alumina results.

EDWARD A. HUNTER.

REFERENCES CITED

The following references are of record in the file of this patent:

UNITED STATES PATENTS

| Number | Name | Date |
|---|---|---|
| 2,283,172 | Bates | May 19, 1942 |
| 2,343,295 | Bailie et al. | Mar. 7, 1944 |
| 2,359,342 | Winding | Oct. 3, 1944 |
| 2,390,556 | Ruthruff | Dec. 11, 1945 |
| 2,445,345 | Byrns | July 20, 1948 |